United States Patent

Poppen

[11] Patent Number: 6,026,384
[45] Date of Patent: *Feb. 15, 2000

[54] COST ZONES

[75] Inventor: Richard Frederick Poppen, San Jose, Calif.

[73] Assignee: Etak, Inc., Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/954,534

[22] Filed: Oct. 21, 1997

Related U.S. Application Data

[63] Continuation of application No. 08/581,169, Dec. 29, 1995, Pat. No. 5,729,458.

[51] Int. Cl.[7] .................................................. G06F 19/00
[52] U.S. Cl. ..................... 705/400; 364/400; 701/201; 701/202
[58] Field of Search ..................................... 340/989, 990, 340/995; 345/440, 441; 364/400; 701/23, 25, 26, 201, 202; 705/400, 417, 418

[56] References Cited

U.S. PATENT DOCUMENTS

| | | | |
|---|---|---|---|
| 4,829,443 | 5/1989 | Pintsov et al. | 364/464.03 |
| 5,031,104 | 7/1991 | Ikeda et al. | 701/209 |
| 5,287,446 | 2/1994 | Williams et al. | 395/152 |
| 5,425,139 | 6/1995 | Williams et al. | 395/152 |
| 5,689,423 | 11/1997 | Sawada | 701/202 |
| 5,712,788 | 1/1998 | Liaw et al. | 701/209 |
| 5,729,458 | 3/1998 | Poppen | 705/400 |

FOREIGN PATENT DOCUMENTS 0 372 840  6/1990  European Pat. Off. .

OTHER PUBLICATIONS

Heckbert, Paul S., *Graphics Gems IV*, 1994, pp. 47–59.
Berry, Joseph K., *Beyond Mapping: Concepts, Algorithms, and Issues in GIS,* 1993, pp. 21–23, 25–29, 31–33, 35–37 (pp. 24, 30 and 34 are blank).
Sedgewick, Robert, *Algorithms,* Second Edition 1988, pp. 415–469 and 471–483 (p. 470 is blank).

*Primary Examiner*—Edward R. Cosimano
*Attorney, Agent, or Firm*—Fliesler, Dubb, Meyer & Lovejoy LLP

[57] ABSTRACT

A cost zone about an origin on an digital map includes the area on the map that can be traveled to, from the origin, which has a cost of travel less than a predetermined cost. The cost can be measured in distance, time of travel, ease of turning, tolls, etc. The steps of creating a cost zone include identifying a set of decision points on the map that are within a predetermined factor of the desired cost, triangulating the decision points to create a set of triangles and interpolating along a subset of the sides of the triangles to estimate the locations along the sides that can be traveled to at the desired cost.

30 Claims, 8 Drawing Sheets

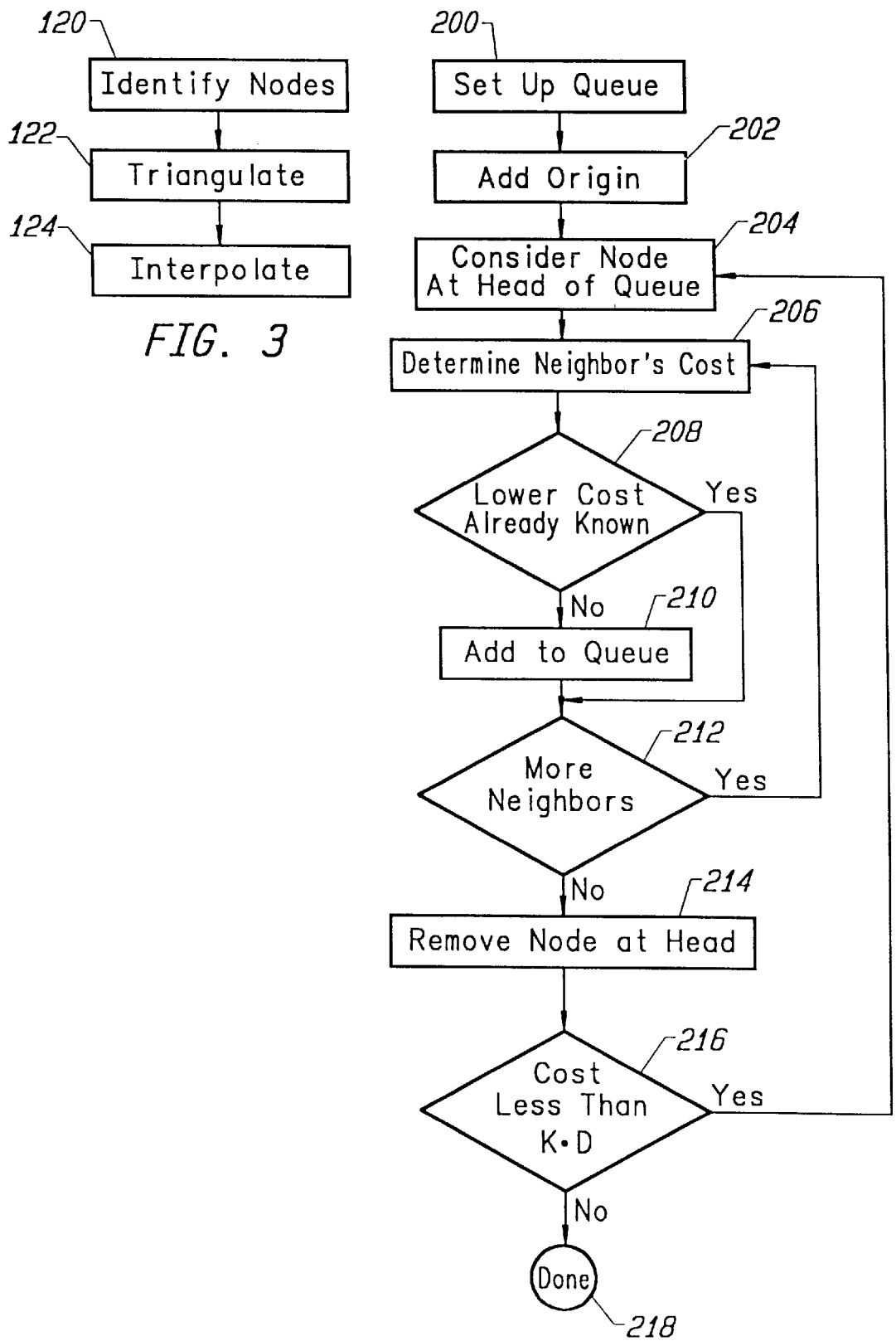

COST ZONES

This application is a continuation of Ser. No. 08/581,169, filed Dec. 29, 1995, which isued on Mar. 17, 1998 as U.S. Pat. No. 5,729,458.

BACKGROUND OF THE INVENTION

1. Field of the Invention

The present invention is directed to a system for creating and using cost zones based on a digital map.

2. Description of the Related Art

The computer has revolutionized the idea of a map from an image statically depicting the location of physical, political, or other features to the digital map, which consists of geographically referenced digital data quantifying a physical, social or economic system. The range of information included in digital maps is unlimited; for example, digital maps could include distances between elements, driving time, lot numbers, tax information, tourist information, etc. Additionally, storing a map as a file on a computer allows for unlimited software applications to manipulate that data. One use that has involved digital maps includes path finding.

One application for digital maps that has not been used effectively is the ability to determine where one can travel within a certain cost limit. Examples of cost include time, distance, tolls paid, ease of turning, quality of scenery, etc. Thus, a traveler may wish to know how far that traveler can drive without paying more than $10 in toll, what restaurants are within a 10 minute drive, or what gas stations are within a one mile walk. In each of these situations, the traveler desires to know where they can travel to within a given cost. The area that they can travel to within that cost is called a "cost zone." In the past, that traveler would look at a traditional map and use the map's key to guess how far they could travel if the cost under consideration was distance. If the cost was time, the traveler would estimate distance and make an educated guess as to time. If the traveler is unfamiliar with the streets on the map, then a guess regarding time of travel would probably not be accurate.

Digital maps in conjunction with path finding systems can be useful for determining cost zones. For example, a digital map can store some or all of the desired costs for the elements in an map. If a user desires to travel to a location, a computer can determine the costs to travel to that location. Such a system is inefficient. If the traveler wants to know all gas stations within one mile, the traveler would have to search a map to find all the gas stations, then run a path finding application once for each such gas station to determine whether that gas station is within one mile.

One attempt at creating cost zones includes using a map already divided into regions unrelated to costs (e.g. zip codes). A point is designated in each region that is used to approximate the entire region. The cost of travel to each of the designated points is determined. Based on those costs, entire regions are included or excluded in the cost zone. Cost zones created by this solution have not proven to be sufficiently accurate.

Therefore, a system is needed that allows a traveler to efficiently and more accurately create and/or use a cost zone.

SUMMARY OF THE INVENTION

The present invention is directed to overcome the disadvantages of the prior art. Thus, the present invention, roughly described, provides for a system that creates a cost zone about an origin on a digital map. The system identifies the set of nodes on the map that are within a predetermined factor of the desired cost of the origin. The system triangulates the set of nodes to create a set of triangles and interpolates along a subset of the sides of the triangles to estimate the locations that have the desired costs. These locations are on the boundary of the cost zone. All such boundary points can be connected to create a closed loop around an area representing the cost zone. When a user of the map proceeds to determine whether a particular location is within the cost zone, a computer need only know the location of the cost zone's boundary and the location of the desired destination to determine whether that destination is within the cost zone.

In one embodiment, the step of identifying the set of nodes includes using a priority queue, and initially considering the origin as the head node. The head node is defined as the node at the head of the priority queue. For each neighbor node of the head node, a cost of traveling from the origin, through the head node and to the neighbor node is determined. A first node is a neighbor node of a second node if the first node can be traveled to from the second node by traversing one link. Each neighbor node and its cost are added to the queue if it is not already stored in the queue with a lower travel cost. The head node is then removed from the queue and the process is repeated until a new head node has a cost that is not within a predetermined factor of the desired cost. The phrase "within a predetermined factor of the desired cost" can include a cost less than a predetermined factor of the desired cost (preferred), or less than or equal to the predetermined factor of the desired cost. One example of such a predetermined factor is 1.5. Thus, if it is desired to determine how far one can drive in 8 minutes, the above process would terminate when a new head node has a cost of 12 minutes (1.5×8).

In one embodiment, the step of triangulating includes creating the Delaunay triangles. One method of creating Delaunay triangles includes adding three nodes to a data structure, creating a triangle out of these three nodes, adding an additional node to the data structure, connecting all three vertices of a surrounding triangle to the additional node if the additional node is within the surrounding triangle, connecting the additional node to all nodes in the data structure that the node can be connected to by a straight line without intersecting the side of any triangle if the additional node is not within any triangle, connecting the additional node to a vertex opposite a particular side of a particular triangle if the additional node is on the particular side, and determining whether at least a subset of triangles in the data structure are all Delaunay triangles.

In one embodiment, the step of interpolating includes interpolating along a first side of a first triangle, a second side of a second triangle and a third side of a third triangle. The first side includes one end point having a cost less than the desired cost and a second end point having a cost greater than the desired cost. The second side includes one end point having a cost less than the desired cost and a second end point having a cost greater than the desired cost. The second triangle shares the first side with the first triangle. The third side includes one end point having a cost less than said desired cost and a second end point having a cost greater than the desired cost. The third triangle shares said second side with the second triangle. This process similarly continues interpolating along other sides of triangles until a closed boundary is determined.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 3 is a flow chart describing the method of creating a cost zone.

FIG. 5 is a flow chart describing the step of identifying a set of nodes on a map that are within a predetermined factor of a desired cost of the origin.

DETAILED DESCRIPTION

Figure 1:
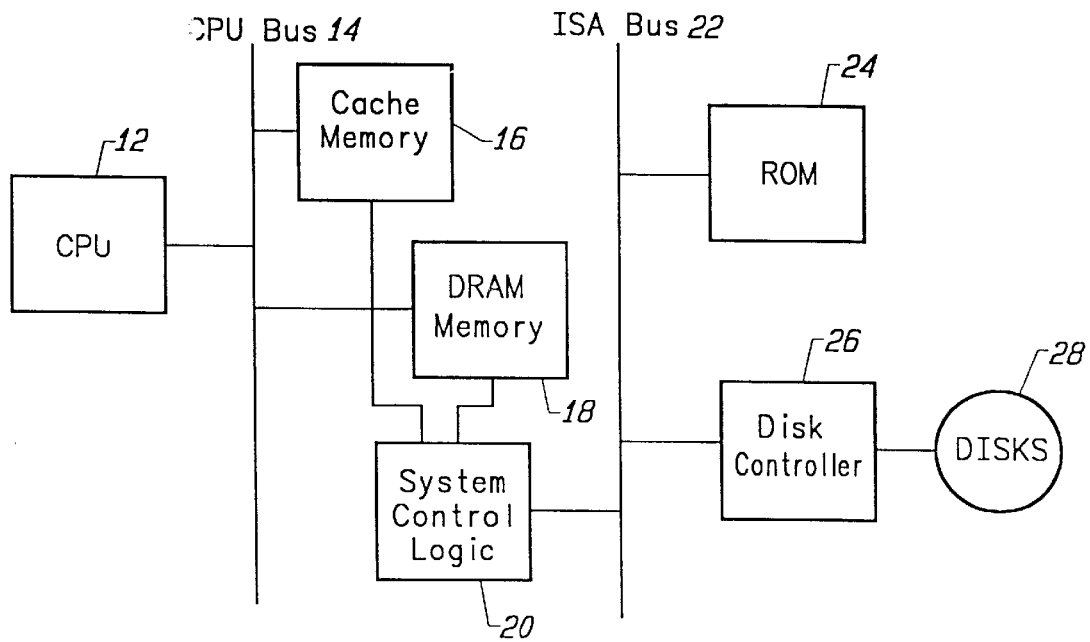
FIG. 1 is a block diagram of one exemplar hardware architecture that can be used to practice the present invention.

FIG. 1 is a symbolic block diagram of one exemplar hardware architecture that can be used to practice the present invention. The hardware comprises a CPU 12, which may be an Intel 80486 compatible CPU or an Intel Pentium processor, for example. CPU 12 has address, data and control lines which are connected to CPU bus 14. CPU bus 14 is also connected to a cache memory 16 and to DRAM memory 18, both of which are controlled by system control logic 20. System control logic 20 is connected to CPU bus 14 and also to control, address and data lines of an ISA bus 22. Connected to ISA bus 22 is ROM 24, which contains the system BIOS, and a disk controller 26 for floppy and hard-disk drives 28. The system of FIG. 1 illustrates one platform which can run software according to the present invention. Numerous other platforms can also suffice, such as Macintosh-based platforms available from Apple Computer, Inc., platforms with different local bus configurations, networked platforms, multi-processor platforms, and so on.

A digital map is stored in one or more computer files which include the data necessary to construct a map. This data could include longitude data, latitude data, addresses, distances, turning restrictions, driving times, highway exit numbers, descriptions of commercial uses of properties, etc. Generally, the map database is too large to be effectively used with most software applications. Thus, smaller databases are created which contain only the data needed for the specific use at hand. One of these smaller databases is a graph. A graph is a collection of nodes and edges. Nodes are objects that have properties and indicate decision points on the graph. An edge is a connection between two nodes. A path from node A to node B in a graph is described as a list of nodes such that there is an edge from each node in the list to the next. A directed graph is a graph where each edge has a single direction associated with it. There may be two edges between a given pair of nodes, one in each direction. In a directed graph, edges are referred to as links. A weighted graph is a graph in which each link (or edge) has a cost associated with it. Alternatives includes associating the costs with the nodes, with the nodes and links, or associating costs with another element of the graph.

Figure 2A:
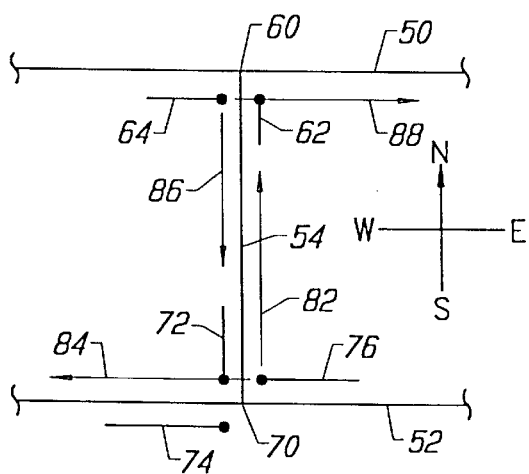
FIG. 2A is an example of a directed graph representing a part of a digital map.

FIG. 2A shows an exemplar directed graph which shows eastbound one-way street 50 and two-way street 52, both intersecting with two-way street 54. Street 50 intersects with street 54 at intersection 60. Street 52 intersects with street 54 at intersection 70. At intersection 60 are two nodes, 62 and 64. The head of the node is a circle. The rear of the node is a straight-line tail. The circle represents where the node is located and the tail represents where a traveller would come from to reach that node. The node symbol is displaced from the actual intersection for purposes of visibility. For example, node 62 represents travel northbound on street 54 toward intersection 60. Node 64 represents travel eastbound on road 50 toward intersection 60. There is no node at intersection 60 to represent westbound travel on street 50 because street 50 is an eastbound one-way street. Thus, a traveller proceeding north on road 54 and reaching intersection 60 can only make a right turn. Node 72 represents arriving at intersection 70 by travelling south on street 54. Node 74 represents arriving at intersection 70 by travelling east on road 52. Node 76 represents arriving at intersection 70 by travelling west on road 52.

Links represent the path between nodes. For example, from node 64 a traveller can make a right turn at intersection 60 to enter road 54 or can proceed straight on road 50. Link 86 represents a traveller who reaches intersection 60 via node 64, makes a right and proceeds to node 72. Thus, link 86 connects node 64 to node 72. Link 88 connects node 64 to the next node on street 50 (not shown on FIG. 2A). A traveller arriving at intersection 70 by travelling west on street 52 (node 76) can continue to proceed on street 52 or can make a right onto street 54. Link 82 represents a traveller who makes the right turn and, thus, link 82 connects node 76 to node 62. Link 84 represents the traveller who remains on road 52 and, thus, connects node 76 to the next node on street 52 (not shown). FIG. 2A only shows links drawn for nodes 76 and 54. If links are drawn for all nodes, the directed graph would become too crowded and would be difficult to read. Thus, the directed graph is simplified and redrawn as in FIG. 2B.

Figure 2B:
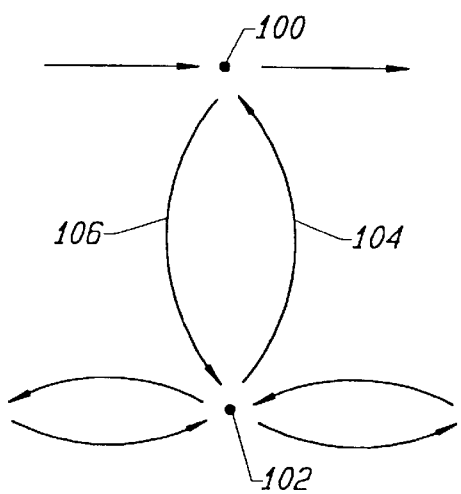
FIG. 2B is second example of a directed graph representing a part of a digital map.

In FIG. 2B, all the nodes at the same intersection are collapsed into one node to make the following explanation simpler. (In actual use, the present invention can make use of a graph similar to FIG. 2A or FIG. 2B.) Thus, node 100 represents nodes 64 and 62. Node 102 represents nodes 72, 74 and 76. Note that the tails of the nodes are not drawn. The links are used to indicate directions of allowable travel. Thus, link 104 indicates travel from intersection 70 to intersection 60 and link 106 indicates travel from intersection 60 to intersection 70. Turn restrictions and one-way streets are represented by the presence or absence of a link.

The directed graph of FIG. 2B is used to symbolically understand the data structure stored by a computer in order to create cost zones. A computer does not actually store an image of a directed graph. Rather, the computer stores a data structure. Each entry in the data structure represents a node. For each node, the data structure stores the location of the node (e.g., latitude and longitude), a list of neighboring nodes (nodes which can be travelled to via one link) and the various costs associated with getting to the neighboring nodes. It is contemplated that the present invention will work with many suitable data structures different from the one described. Furthermore, the invention need not be used with a directed graph. The present invention can be used with the entire map database, or any other suitable subset of information.

To create a cost zone from a digital map, a traveller must indicate an origin on a map which references the traveller's location or the center of the cost zone. The traveller must also indicate the desired cost, which includes the type of cost and the amount of that cost to be used to create the cost zone. For example, a traveller may indicate the cost type to be driving time and the amount of cost to be 8 minutes. Thus, the cost zone would be created which represents the area on a map about the origin to which the traveller can drive to in 8 minutes.

FIG. 3 depicts a flow chart for the method for creating a cost zone about an origin. The first step 120 is to identify nodes on the map that are within a predetermined factor of a desired cost of the origin. The desired cost in this example described herein is 8 minutes of driving time. A predetermined factor is usually some number greater than 1 (one) that is used to find an area on the map that includes all those areas within the predetermined cost and some additional locations having a cost greater than the desired cost so that interpolation can be done in future steps. In this example, the predetermined factor is set as 1.5. The predetermined factor would change depending upon the detail and density of the map. The appropriate value for a specific implementation can be determined based on trial and error. Thus, in step 120, all nodes on the map which have a driving time of 12 minutes from the origin (8 min.×1.5) would be identified. In step 122, a set of triangles is created with the vertices of the triangles being the locations of nodes identified in step 120. In step 124, the system interpolates along a subset of the sides of the triangles to find the locations where the cost of driving is estimated to be 8 minutes. FIG. 3 shows steps 120, 122 and 124 as separate steps; however, these steps can be interleaved.

Figure 4:
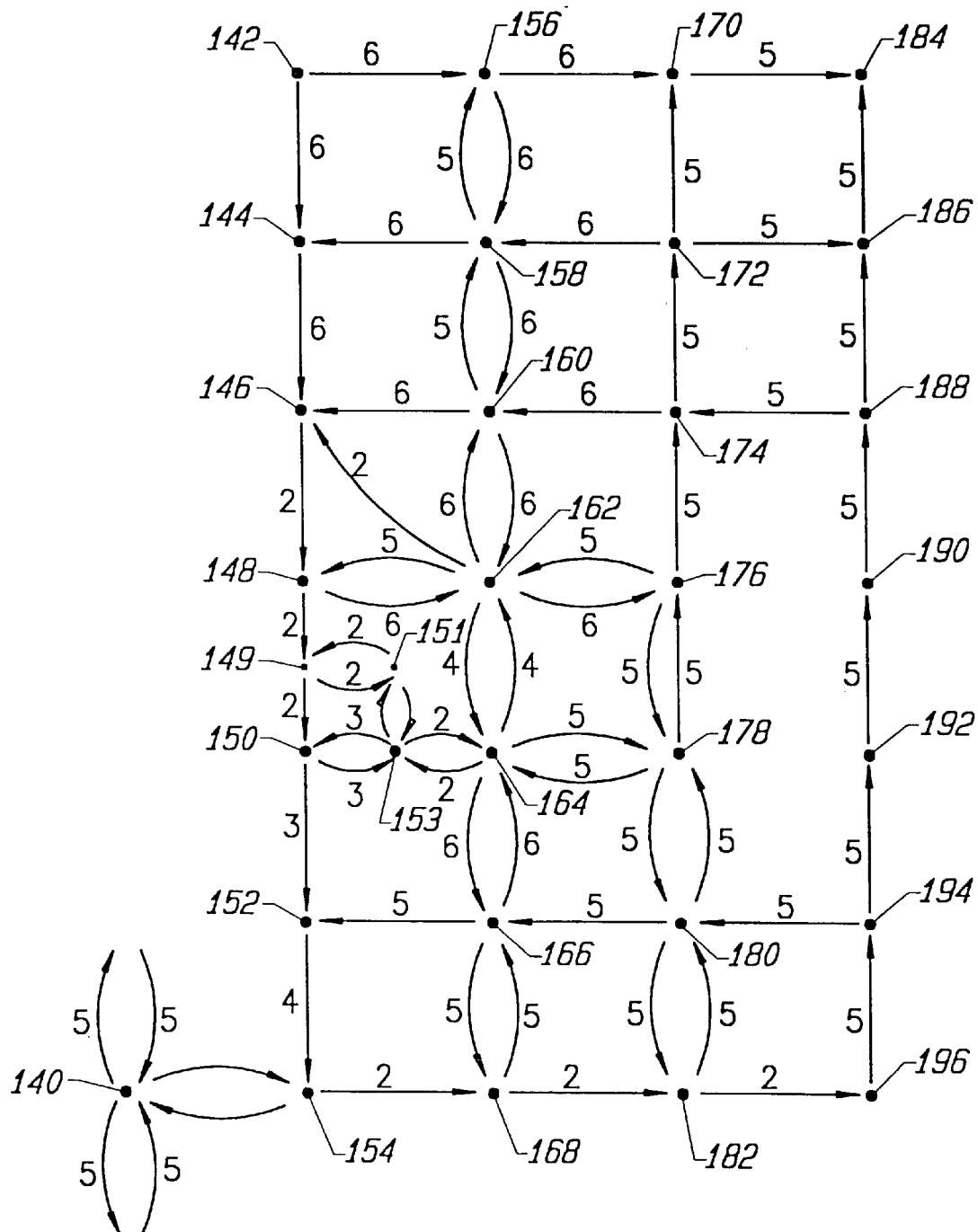
FIG. 4 is an exemplar graph representing a portion of an digital map.

FIG. 4 is a directed graph of a portion of a digital map. The filled-in circles represent nodes, the arrows represent links and the numbers next to the links represent costs, which in this example is driving time in minutes. The differences in driving times for the different links are based on the type of road and the topography of the road. For example, highways are associated with shorter driving times for a given distance than a congested street in the middle of a commercial area of town. In the example in FIG. 4, the origin is node 162. FIG. 4 also shows nodes 140, 142, 144, 146, 148, 149, 150, 151, 152, 153, 154, 156, 158, 160, 164, 166, 168, 170, 172, 174, 176, 178, 180, 182, 184, 186, 188, 190, 192, 194 and 196.

One embodiment of step 120 in FIG. 3 is explained in more detail with the flow chart of FIG. 5, using the directed graph of FIG. 4. In this example, the goal of step 120 is to find all nodes within 12 minutes of driving time at node 162. For example, the link between origin 162 and node 176 indicates a driving time of 6 minutes. Thus, node 176 is within the predetermined factor of the desired cost of origin 162. Alternatively, travelling from origin 162 to node 156, (via nodes 160 and 158) requires a travel time of 16 minutes, which is not within the 12 minute cut-off. The steps to identify all those nodes which are within the cut-off are detailed in FIG. 5.

In step 200, a priority queue is set up. In the present example, the priority queue stores the node's location and the cost of getting to the node from the origin. The priority queue sorts the members of the queue based on cost, the lowest cost being at the head of the queue. In step 202, the origin along with its cost is added to the queue. The cost of getting to the origin is typically 0. In step 204, the system considers the node at the head of the queue (the head node). Since the origin is the only member of the queue, the origin 162 is at the head of the queue. In step 206, the system arbitrarily picks one of the neighbors of the head node and determines the cost of travelling from the origin through the head node to that respective neighbor. In the current example, origin 162 has five neighbors that can be travelled to: node 160, node 146, node 148, node 164 and node 176. For example purposes, the system picks node 146 as the first neighbor and determines that the cost is 2 minutes. In step 208, the system determines whether the neighbor is already on the queue with a lower cost. If the neighbor is already in the queue with a lower cost, then the system skips to step 212. If the neighbor is not already in the queue with a lower cost, then step 210 is performed. In the example, node 146 is not on the queue; therefore, node 146 with a cost of 2 minutes is added to the queue (step 210). In step 212, the system determines whether there are any more neighbors. As discussed above, origin 162 has four more neighbors, so the answer is "yes".

The system loops back to step 206, which determines the next neighbor's cost. The next neighbor to be examined in the example is node 148. The cost of travelling from origin 162 to node 148 is 5 minutes. In step 208, it is determined that node 148 is not in the queue, thus, in step 210, node 148 with a cost of 5 minutes is added to the queue. Note that node 148 is placed below node 146 on the queue. Next, node 164 is considered in step 206. The cost of travelling to node 164 is 4 minutes. Since there is not a known cost that is lower than 4 minutes for node 164 already in the queue (step 208), node 164 is added to the queue behind node 146 and in front of node 148 in step 210. Since node 162 has two more neighbors that have not been considered, in step 206, the system determines the cost of travelling to neighbor 176 to be 6 minutes. Since there is no lower cost already stored in the queue (step 208), node 176 is added to the bottom of the queue (step 210). The system considers node 160 (step 206), which has a cost of 6 minutes. Since the queue does not already have a known cost lower than 6 minutes for node 160 (step 208), node 160 is added to the queue below node 176. Note that node 176 and node 160 have the same cost. The system can arbitrarily decide which node to put in the queue in front of the other. One method is to store node 176 in front of node 160 since node 176 was put in the queue first. Since there are no more neighbors to consider (step 212), the system then removes the node at the front of the queue in step 214 and stores the removed node in a data structure. At this point, the queue includes the following entries in this order: node 146 (head of queue), node 164, node 148, node 176 and node 160.

In step 216, the system looks at the head of the queue, which in this case is node 146, and asks whether the cost associated with the node at the head of the queue is less than the predetermined factor (K) of the desired cost (D). Since the predetermined factor of the desired cost is 12 minutes and the cost associated with node 146 is 2 minutes, the answer to that comparison is "yes" and the system loops back to step 204. If the cost of the front node on the queue were greater than 12 minutes, then step 120 of FIG. 3 would be finished.

In the current example, the system loops back to step 204 and considers node 146 which is at the head of the queue. In step 206; the system looks at the only neighbor of node 146. Although looking at FIG. 4 shows that nodes 144 and node 160 are near node 146, the links show that a traveller at node 146 can only travel to node 148. The links between nodes 146 and 144 and nodes 146 and 160 indicate one-way streets travelling towards node 146. Thus, in step 206, the system looks at the cost of travelling from the origin, through node 146 and to node 148. Looking at FIG. 4, this includes travelling along the link between node 162 to node 146 and travelling along the link from node 146 to node 148. The link from node 162 to node 146 has a cost of 2 minutes, and the link from node 146 to node 148 has a cost of 2 minutes; therefore, the cost of travelling from the origin to node 148 through node 146 is 4 minutes. In step 208, the system determines whether node 148 is already in the queue with a lower cost. In this case, node 148 is already on the queue with a cost of 5 minutes. The cost of 5 minutes of driving directly from node 162 to node 148 is higher than the cost of driving to node 148 through node 146, which is 4 minutes. The queue entry of node 148 with a cost of 5 minutes is removed from the queue and a new entry is added to the queue which includes node 148 and a driving time of 4 minutes (step 210). Thus, the step of adding to the queue may, in some instances, include editing or existing on entry already existing on the queue. In step 212, the system determines that node 146 does not have any more neighbors, and in step 214, node 146 is removed from the queue. At this point, the queue has the following entries in the following order: node 164, node 148, node 176 and node 160. In step 216, the system determines whether the head of the queue, node 146, has a cost less than 12 minutes. In this case, it does and the system loops back to step 204.

Figure 6:
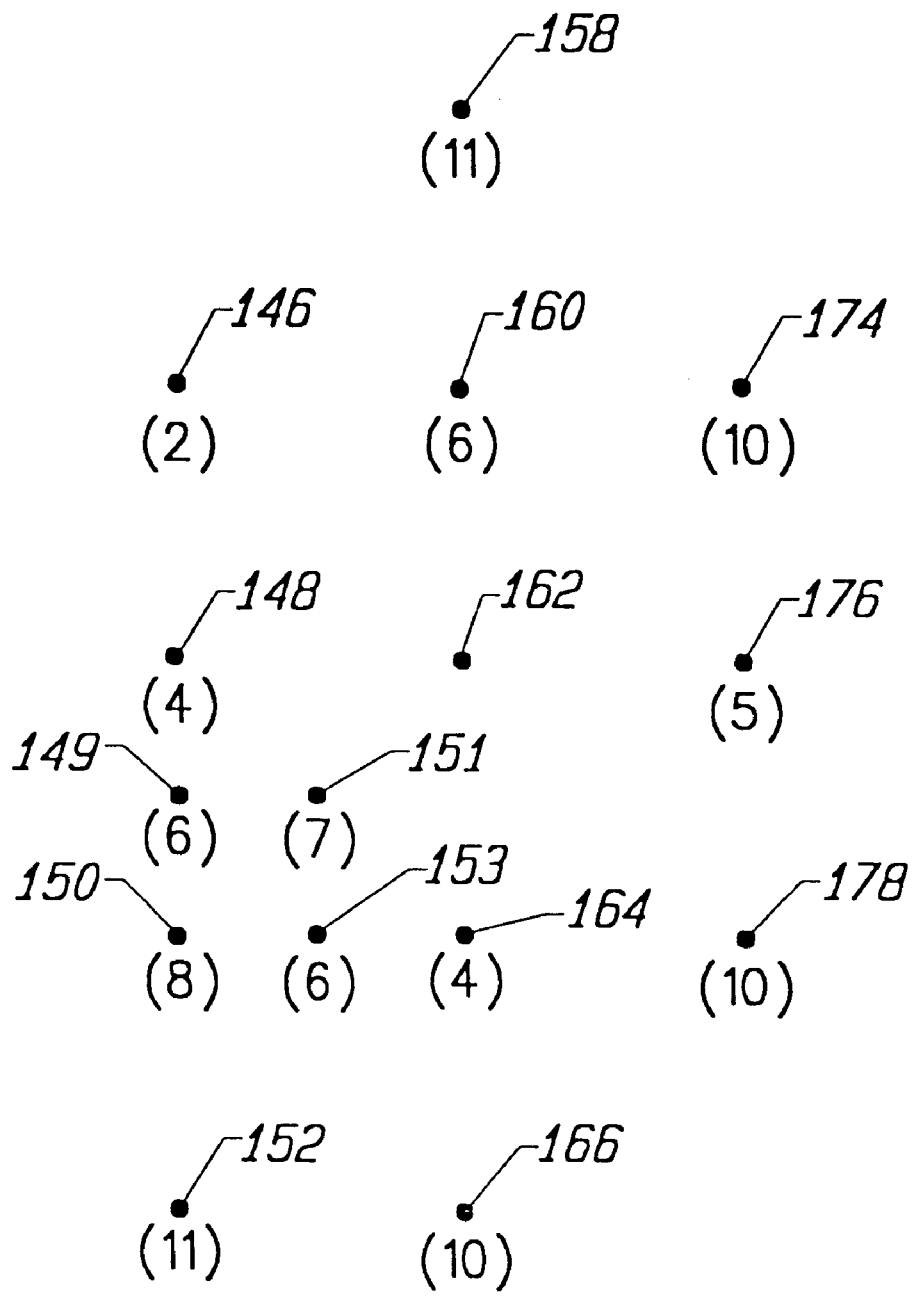
FIG. 6 depicts a portion of the graph of FIG. 4 showing only those nodes that are within a predetermined factor of the desired cost of the origin.

When each node is removed from the queue in step 214, the removed node is placed into a data structure. When step 216 determines that the node at the head of the queue has a cost greater than or equal to 12 minutes, the method of FIG. 5 is completed (218) and the data structure created in step 214 represents all those nodes that are within the predetermined factor of the desired cost of the origin (e.g., 12 minutes). This data structure includes the location of each node and the associated cost of travelling to the node from the origin. FIG. 6 symbolically depicts all the nodes from FIG. 4 that would have been placed in the data structure including nodes 146, 148, 149, 150, 152, 158, 160, 162, 164, 166, 174, 176, and 178. In parentheses next to each node is the cost for that node which is stored in the data structure. Note that origin 162 is considered a node and is included in the data structure.

Figure 7A:
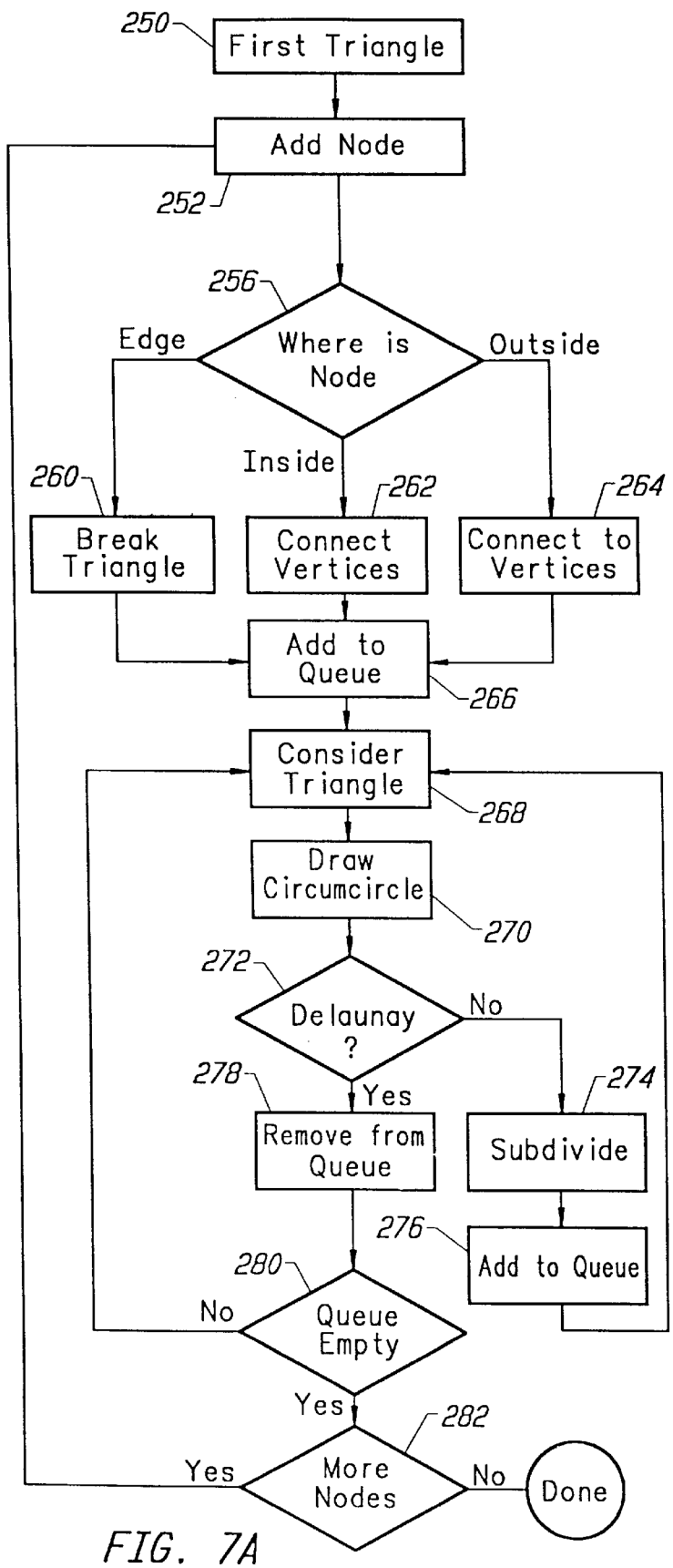
FIG. 7A is a flow chart describing the step of triangulating.

FIG. 7A is a more detailed flow chart describing one embodiment of the step of triangulating the nodes. Other methods of creating triangles are also within the spirit of the present invention. The steps described in FIG. 7A are taken on the data structure symbolized by FIG. 6. In step 250, the system takes the first three nodes that were removed from the priority queue in step 214, stores the nodes in a data structure (triangle data structure), and creates a triangle by connecting the nodes together. The step of creating a triangle does not necessarily mean drawing a triangle and actually connecting the nodes. Rather, the system stores the coordinates of the three nodes at the vertices of a triangle. The lines symbolically connecting the nodes to form the triangle are called sides. The newly created triangle is put in a queue (the "triangle queue"). In step 252, the system takes the next node that was removed from the priority queue in step 214 and adds that to the triangle data structure. (The phrase "data structure" refers to any file or structure storing data.) In step 256, the system determines if the node is within an already existing triangle, outside an already existing triangle, or on a side of an already existing triangle.

Figure 7B:
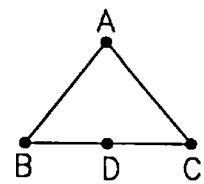
FIGS. 7B–7E depict examples of triangles used to explain the steps depicted in FIG. 7A.
Figure 7C:
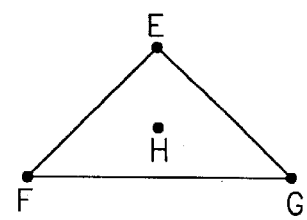
Figure 7D:
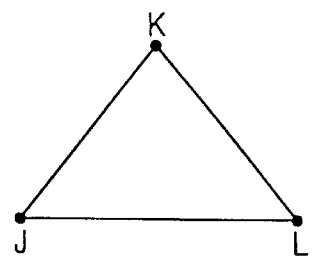

If the new node added in step 252 is on a side of an already existing triangle, the triangle is broken by drawing a line from the opposite vertex to the new node, thereby creating two triangles (step 260). FIG. 7B shows new node D being added to existing triangle ABC. Node D is on side BC. Therefore, in step 260, a line would be drawn from node A to node D, thereby breaking triangle ABC into two triangles, ABD and ADC. If the new node added in step 252 is inside an already existing triangle, then in step 262 the new node is connected to all three vertices of the triangle it is contained in. For example, in FIG. 7C, new node H is inside an already existing triangle EFG. In step 262, a first line is drawn connecting node H to node E, a second line is drawn connecting node H to node F and a third line is drawn connecting node H to node G. If the new node added in step 252 is outside any already existing triangles, then the new node is connected to any of the nodes in the triangle data structure that the additional node can be connected to by a straight line without intersecting any sides. For example, in FIG. 7D, new node M is outside triangle JKL. Thus, a line is drawn from node M to all other nodes that M can be connected to by a straight line without intersecting any side. Thus, a first line is drawn connecting node M to node J and a second line is drawn connecting node M to node L. No line connecting node M to node K would be created because such a line would intersect the preexisting side between J and L. Any new triangles created by steps 260, 262 or 264 are added to the triangle queue (step 266).

Figure 7E:
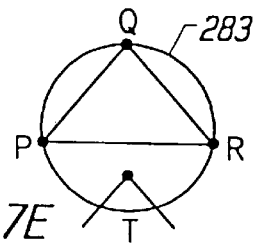

At this point, all the triangles in the triangle queue must be examined to ensure that they are Delaunay triangles. A triangle is a Delaunay triangle if the circumcircle of that triangle does not contain any other nodes in the triangulation in its interior. The circumcircle of a triangle is the circle which has all three vertices of the triangle along its circumference. Thus, in step 268, the first triangle of the queue is considered. In step 270, a circumcircle is drawn around that triangle. In step 272, the system determines whether the triangle under consideration is Delaunay. Since the method is carried out by a computer, or other type of processor, the computer does not actually draw any triangles or circles, but uses mathematics known in the art to determine the relevant coordinates of the triangles and whether a circumcircle would actually include any other nodes. If the triangle is not Delaunay, the triangle is subdivided in step 274 and the new triangle(s) are added to the triangle queue in step 276. The step of subdividing in step 274 includes removing the closest side to the node outside the triangle but within the circumcircle connecting the outside node to the nodes at the end points of the removed side and then subdividing the resulting quadrilateral by adding its other diagonal. For example, in FIG. 7E, triangle PQR is not Delaunay because node T is within circumcircle 283. Thus, the triangle PQR must be subdivided in step 274, which includes removing side PR, connecting nodes P and T, connecting nodes T and R and connecting nodes T and Q. The result is two triangles, PQT and RQT. The system then considers the next triangle in the triangle queue in step 268. If the triangle under consideration was a Delaunay triangle (step 272), then that triangle is removed from the queue (step 278). Steps 268–280 are continued until the triangle queue is empty (step 280). In step 272, if a triangle is determined not to be Delaunay, it is because there is a node outside the side of the triangle, but inside the circumcircle. After the queue is empty, the system determines whether any more new nodes need to be added to the triangle data structure (step 282). If not, the triangulation is done. If so, the system loops back to step 252 and adds the new node.

Figure 8:
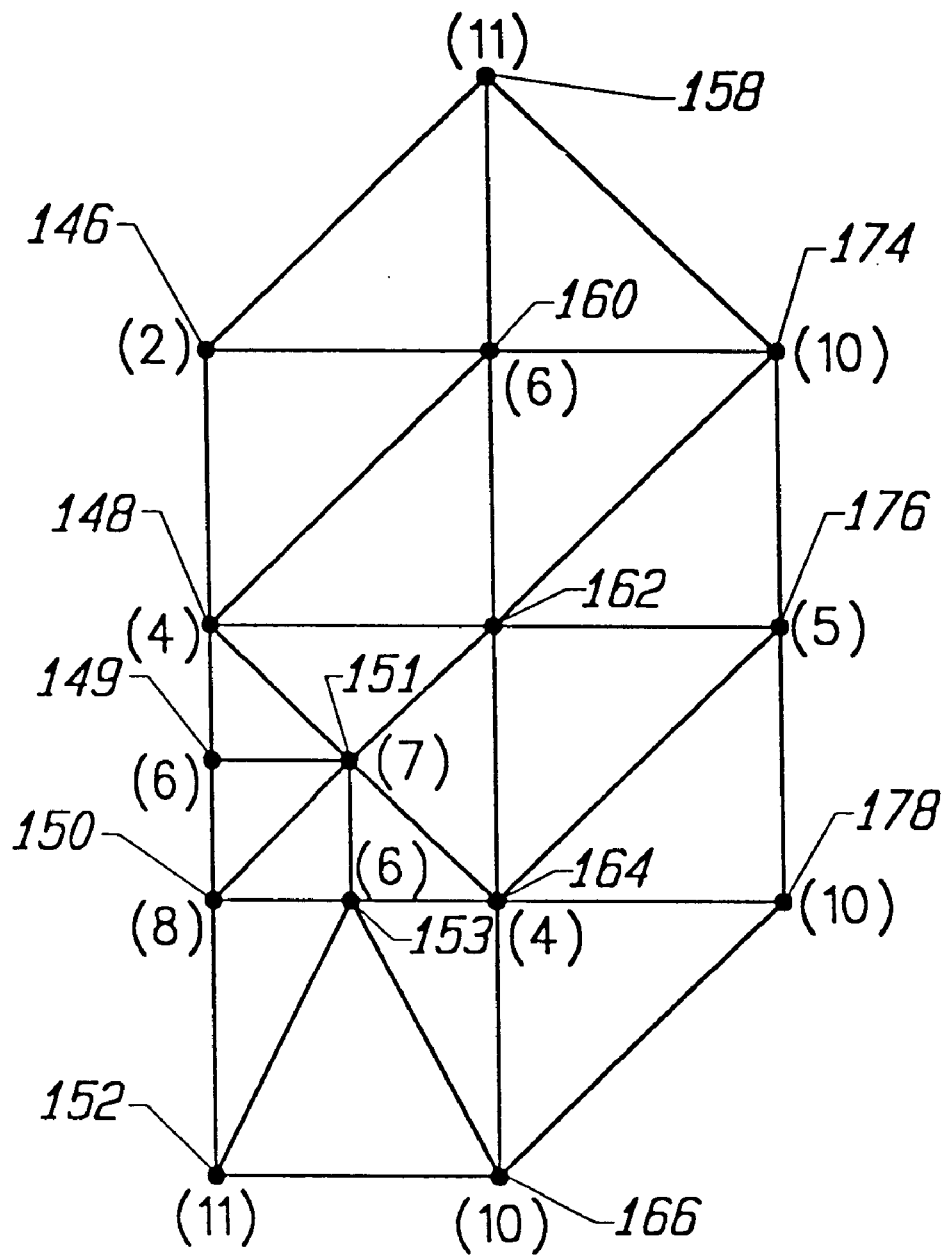
FIG. 8 depicts the partial graph of FIG. 6 after the step of triangulating.

FIG. 8 symbolically represents the triangle data structure after the method depicted in FIG. 7A is complete. Next to each node is a number in parentheses which represents the cost of getting to that node from the origin based on the cost that was removed with the node from the priority queue in step 214. Note that all of the triangles shown in FIG. 8 are Delaunay triangles. The triangle data structure includes an entry for each node. At each entry, the data structure stores the vertex's location, the cost from the origin and all the other vertexes that it is connected to via triangle sides.

Figure 9:
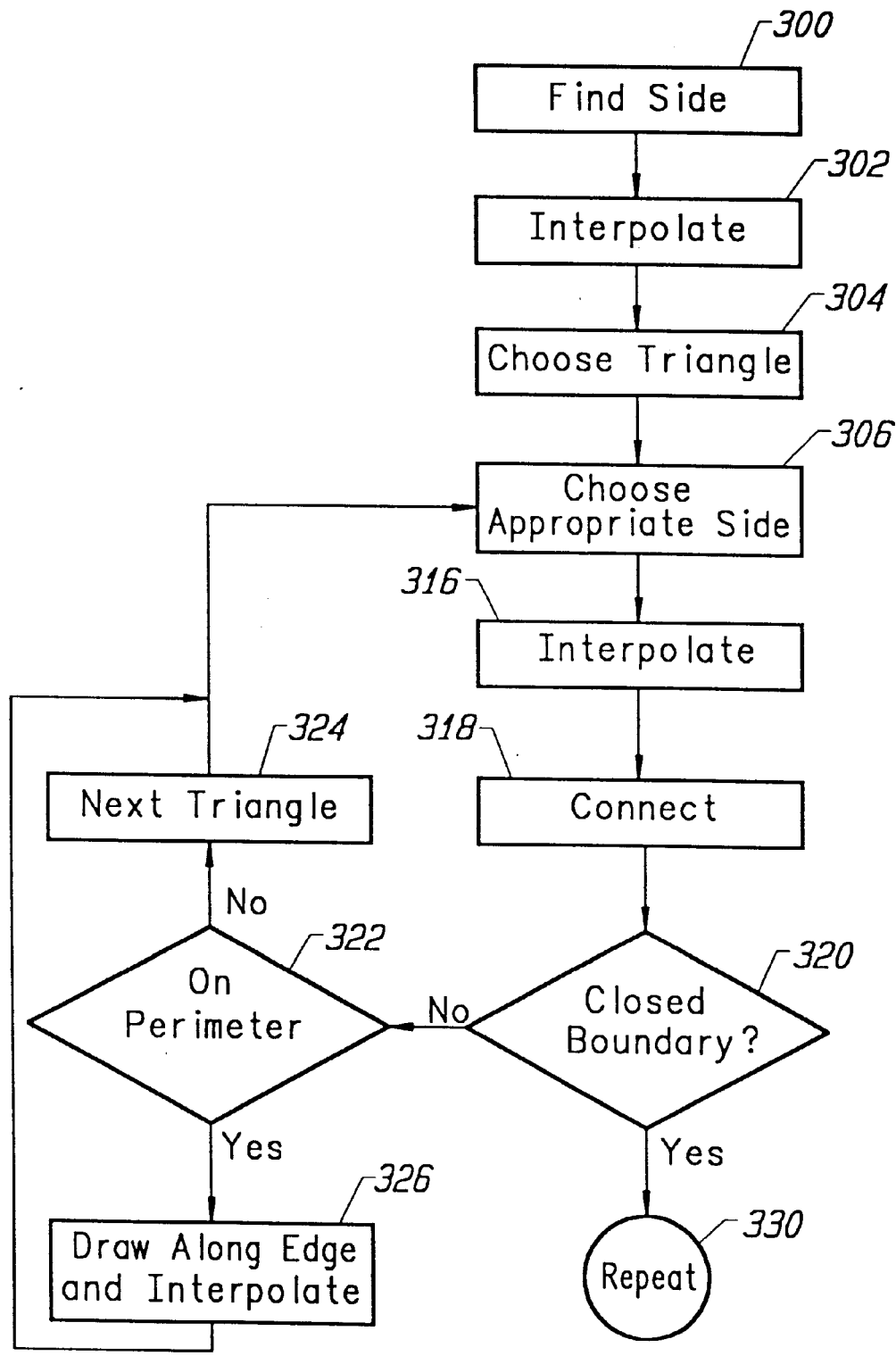
FIG. 9 is a flow chart describing the step of interpolating.

FIG. 9 is a flow chart describing the step of interpolating along a subset of the sides of the triangles to estimate locations on the sides having the desired cost. In step 300, the system systematically searches the triangle data structure for a triangle side which has one end point having a cost greater than the desired cost (8 minutes) and one end point having a cost below the desired cost. In step 302, the system linearly interpolates along that side to estimate the location along the side where the cost of travelling to that location is equal to the desired cost. Although the preferred system uses linear interpolation, it is contemplated that other modes of interpolating will be effective with the present invention. In most cases, the chosen side from step 300 is part of two triangles. In step 304, the system arbitrarily chooses one of those two triangles. The chosen triangle has two sides other than the side already interpolated on. In step 306, the system chooses an appropriate side from the two remaining sides at the chosen triangle. An appropriate side has an end point below the desired cost and an end point above the desired cost. The system then interpolates along the chosen appropriate side to estimate the location along the side where the cost of travelling to that location is equal to the desired cost (step 316).

After the interpolation in step 316, the system now has two locations representing the locations estimated to have the desired cost. In step 318, the system symbolically connects the two locations together. By symbolically, it is meant that the system does not actually draw a line segment; rather, the system stores the end points of the line segment in a file or data structure. The line segment symbolically drawn between the two locations is called the boundary line segment. In step 320, the system determines whether the boundary line has been closed, that is, whether the boundary is a closed loop. When the boundary line has been closed, the interpolation is finished. If the boundary is not a closed loop, the system determines whether the boundary segment has reached the perimeter of the geographical area represented in the data structure (step 322). If not, the system considers the next triangle (step 324). The side which includes the second interpolated location borders two triangles. The boundary line segment just drawn is drawn through one of the triangles and in step 324, the system chooses the other triangle and loops back to step 306, at which point it chooses an appropriate side in that other triangle. If the boundary line segment has reached the perimeter of the triangles, the system will continue to draw the boundary line segment along the sides at the perimeter, in the direction toward the end point with the lower cost, until it reaches a triangle side that has an end point below the desired cost and an end point above the desired cost (step 326). When it finds such a triangle side, the system interpolates along the triangle side to find the location estimated to have the desired cost and draws the boundary line segment to that location, then the system will loop back to step 306, at which point the system will choose one of the two other sides in the triangle that contains the side with the interpolated location.

Note that in step 316, it is possible that a side has one end point that has a cost equal to the desired cost. In that case, the step of interpolating does not need to actually interpolate and in step 318, the boundary line is connected directly to the end point. However, for purposes of choosing the next triangle in step 324, the process proceeds as if the end point had a cost greater than the desired cost, so that there will be no issue as to which is the next triangle.

When the steps of FIG. 9 have completed, the system will then repeat all the steps (step 330) starting from step 300. That is, the system will go back and look for any side that does not intersect with the boundary line, but does have an end point below the desired cost and an end point above the desired cost. If the system finds such a side, the system repeats steps 300–330 and creates a separate boundary line. This situation signifies an island within the geographic area which may not be accessible within the desired cost. For example, travel to a gated community may not be available to a traveller. In one embodiment, if the system finds an island within a cost zone, and the island is less than a predetermined small fraction (e.g. 1%) of the cost zone's area, then the island can be disregarded as being insignificant. Alternatively, the system may find an island of inclusion that is outside the boundary. The steps of FIG. 9 describe the step of symbolically drawing a boundary line. Since these steps are performed by a computer, the computer may draw a boundary line on a screen or map, or may create a boundary data structure which includes a set of vertices of a polygon.

Figure 10:
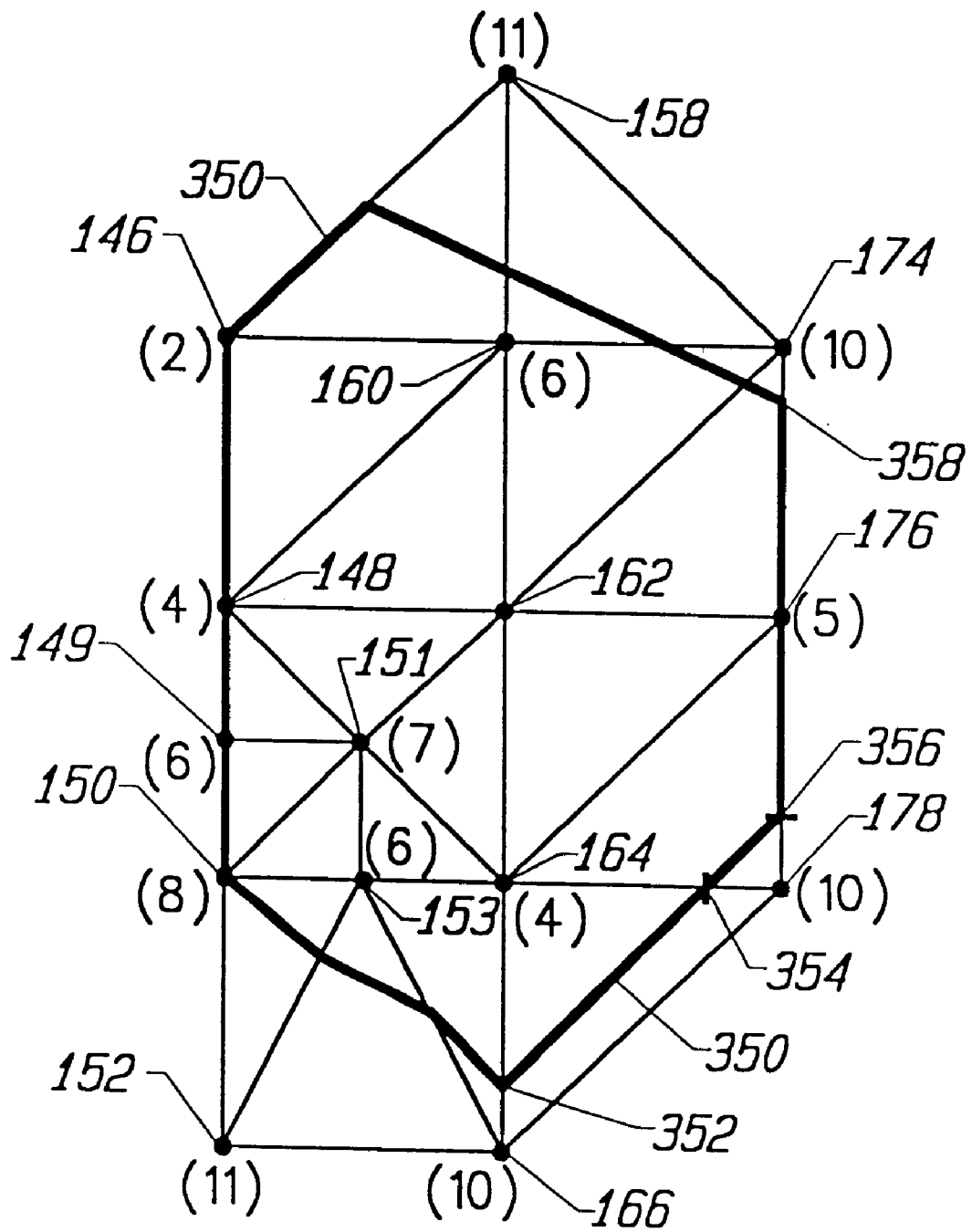
FIG. 10 shows the partial graph of FIG. 8 after the step of interpolating.

FIG. 10 is a graphical representation of a heavily shaded boundary line 350 superimposed on the graph of FIG. 8. For example purposes, assume that the first side found in step 300 is the side between node 164 and node 166. Node 164 has a cost of 4 minutes which is below the desired cost of 8 minutes. Node 166 has a cost of 10 minutes which is above the desired cost. Interpolating along the side between nodes 164 and 166 would find a location 352 two-thirds of the distance from node 164 toward node 166. Next, the system would choose a triangle, for example, the triangle bounded by nodes 164, 166 and 178. The system then chooses one side, for example, the side between nodes 166 and 178. That side is not an appropriate side, therefore, the system chooses the other side, between nodes 164 and 178. That side is appropriate because one end point has a cost of 4 minutes and another end point has a cost of 10 minutes. The system interpolates along that side to estimate a location 354 having a cost of 8 minutes. Location 354 is two-thirds of the distance from node 164 toward node 178. Location 352 and 354 are connected by a boundary line segment. Since the boundary is not closed along that side, another triangle is selected. The system chooses the triangle bounded by nodes 164, 178 and 176 because it is the other triangle containing the side just interpolated, and chooses the side between nodes 178 and 176. This side has one end point having a cost of 5 minutes and another end point having a cost of 10 minutes. The system interpolates to find location 356 to be two-fifths the distance from node 178 to node 176. A boundary line segment is drawn from location 354 to location 356. Because location 356 is along the perimeter, the system continues to draw the boundary line along the perimeter until it finds an side which has an end point above and below the desired cost and then interpolates to find the location of the desired cost. In FIG. 10, the system would continue to draw the boundary line until location 358, at which time the system would continue choosing triangles and interpolating until the entire boundary line 350 is drawn, as shown in FIG. 10.

When the system completes the steps in FIG. 9, a data structure exists storing the location (e.g. latitude and longitude) of the vertices of a polygon which represents the boundary line. That data structure can be used for many purposes. For example, the system can draw a map which includes the boundary line, a map can be drawn of the cost zone, a map can be drawn showing the cost zone in a special color, etc. Alternatively, the system can include an application which allows the user to query whether a particular location, address or business is within the boundary. Or, the system can include an application where the user can ask for a list of all of a specific types of locations that are in the cost zone boundary. For example, a user could ask for all restaurants within the cost zone, or all gas stations within the cost zone, etc. The system would then check the coordinates of all or a specific type of locations to determine if the checked locations are in the cost zone.

In one alternative, a user could ask for a cost zone by specifying more than one cost value. For example, the user may want to know the cost zones which specifies everywhere that user can travel in 5 minutes, 10 minutes, or 15 minutes. In that scenario, the system would carry out steps 120 and 122 for the largest cost (e.g., 15 minutes). Step 124, the step of interpolating, would be carried out separately for 5 minutes, 10 minutes and 15 minutes.

Another alternative includes determining a cost zone about the origin for all of the locations that can be traveled from in order to arrive at the origin within the desired cost. For example, consider a taxi company that advertises pickup within 5 minutes receives a call for a taxi to pick up a customer at the customer's home (the origin). The taxi company knows the location of at least a subset of its taxis. The dispatcher may create a cost zone to find out all of the places that a taxi could drive from to reach the customer's home within 5 minutes. Such a cost zone is created by using the steps in FIG. 3. When considering the neighbors of node at the head of the queue and the neighbors' costs, the system would consider the links pointing from the neighbor to the node at the head of the queue rather the links pointing to the neighbor.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for implementing a cost zone using an electronic map, comprising the steps of:
   storing an indication of an origin;
   determining costs for traversing said electronic map from said origin to a set of locations in said electronic map; and
   determining a subset of said set of locations in said electronic map that are approximately a predetermined cost from said origin, said subset of said set of locations defining boundary of said cost zone.

2. A method according to claim 1, further including the step of:
   receiving an indication of said predetermined cost.

3. A method according to claim 1, further including the step of:
   receiving an indication of a type of cost to be minimized.

4. A method according to claim 1, further including the step of storing said subset of said set of locations in a data structure.

5. A method according to claim 1, wherein:
   said subset of said set of locations are vertices of a polygon, said polygon represents said boundary.

6. A method according to claim 1, further including the step of:
   drawing said boundary.

7. A method according to claim 1, further including the steps of:
   drawing at least a portion of said electronic map; and
   drawing said boundary.

8. A method according to claim 1, further including the steps of:
   receiving a query as to whether a particular address is within said cost zone; and
   determining whether said particular address' location in said electronic map is in said cost zone.

9. A method according to claim 1, further including the steps of:
   receiving a query as to whether a particular business is within said cost zone; and
   determining whether said particular business' location in said electronic map is in said cost zone.

10. A method according to claim 1, further including the step of:
    determining an island inside said cost zone, said island representing an area not accessible within said predetermined cost.

11. A method according to claim 1, further including the step of:
    determining an island outside said cost zone, said island representing an area accessible within said predetermined cost.

12. A method according to claim 1, further including the step of:
    receiving said indication of an origin.

13. A method according to claim 1, further including the steps of:
    drawing at least a portion of said electronic map; and
    highlighting said cost zone.

14. A method according to claim 13, wherein:
    said step of highlighting includes showing said cost zone in a different color than other portions of said electronic map.

15. An apparatus for implementing a cost zone using an electronic map, comprising
    a display,
    a processor readable storage unit for storing at least part of said electronic map;
    drawing said boundary.

16. An apparatus according to claim 15, wherein said method further comprising the step of:
    receiving an indication of said predetermined cost.

17. An apparatus according to claim 15, wherein said method further comprising the step of:
    receiving an indication of a type of cost to be minimized.

18. An apparatus according to claim 15, wherein said method further comprising the step of:

storing said set of locations in a data structure.

19. An apparatus according to claim 15, wherein said method further comprising the step of:

drawing said boundary.

20. A processor readable storage medium having processor readable code embodied on said processor readable storage medium, said processor readable code for programming a processor to perform a method comprising the steps of:

receiving an indication of an origin;

determining costs for traversing said electronic map from said origin to a set of locations in said electronic map; and determining a subset of said set of locations in said electronic map that are approximately a predetermined cost from said origin, said subset of said set of locations defining a boundary of said cost zone.

21. A processor readable storage medium according to claim 20, wherein said method further comprises the step of:

receiving an indication of said predetermined cost.

22. A processor readable storage medium according to claim 20, wherein said method further comprises the step of:

receiving an indication of a type of cost to be minimized.

23. A processor readable storage medium according to claim 20, wherein said method further comprises the step of:

storing said subset of said set of locations in a data structure.

24. A processor readable storage medium according to claim 20, wherein said method further comprises the step of:

drawing said boundary.

25. A processor readable storage medium according to claim 20, wherein said method further comprises the steps of:

receiving a query as to whether a particular address is within said cost zone; and determining whether said particular address' location in said electronic map is in said cost zone.

26. A method for implementing a cost zone using an electronic map, comprising the steps of:

storing an indication of an origin;

storing an indication of a predetermined cost;

storing costs for traversing said electronic map from said origin to a set of locations in said electronic map; and determining a subset of said set of locations in said electronic map that are approximately a predetermined cost from said origin, said subset of said set of locations defining a boundary of said cost zone.

27. A method according to claim 26, further including the step of:

receiving an indication of a type of cost to be minimized.

28. A method according to claim 26, further including the step of:

storing said subset of said set of locations in a data structure.

29. A method according to claim 26, further including the step of:

receiving said indication of said origin.

30. A processor readable storage medium having processor readable code embodied on said processor readable storage medium, said processor readable code for programming a processor to perform a method comprising the steps of:

storing an indication of an origin;

storing an indication of a predetermined cost;

storing costs for traversing said electronic map from said origin to a set of locations in said electronic map; and determining a subset of said set of locations in said electronic map that are approximately a predetermined cost from said origin, said subset of said set of locations defining a boundary of said cost zone.

* * * * *

UNITED STATES PATENT AND TRADEMARK OFFICE
CERTIFICATE OF CORRECTION

PATENT NO. : 6,026,384
DATED : February 15, 2000
INVENTOR(S) : Richard Frederick Poppen Page 1 of 1

It is certified that error appears in the above-identified patent and that said Letters Patent is hereby corrected as shown below:

Column 11,
Line 65, after "defining" and before "boundary" insert -- a --

Column 12,
Line 55, delete "," and substitute therefore -- ; --
Line 59, delete "drawing said boundary." and substitute therefor --
  a processor in communication with said display and said processor readable storage unit, said processor programmed to perform a method for implementing a cost zone, said method comprising the steps of:
  receiving an indication of an origin,
  determining costs for traversing said electronic map from said origin to a set of locations in said electronic map, and
  determining a subset of said set of locations in said electronic map that are approximately a predetermined cost from said origin, said subset of said set of locations defining a boundary of said cost zone. --

Signed and Sealed this

Twentieth Day of November, 2001

Attest:

NICHOLAS P. GODICI
Attesting Officer  Acting Director of the United States Patent and Trademark Office